US010955060B2

(12) United States Patent
Takahashi et al.

(10) Patent No.: US 10,955,060 B2
(45) Date of Patent: Mar. 23, 2021

(54) SWITCH VALVE

(71) Applicants: DENSO CORPORATION, Kariya (JP); FUJIKOKI CORPORATION, Tokyo (JP)

(72) Inventors: Koji Takahashi, Kariya (JP); Kenichi Mochizuki, Tokyo (JP)

(73) Assignees: DENSO CORPORATION, Kariya (JP); FUJIKOKI CORPORATION, Tokyo (JP)

( * ) Notice: Subject to any disclaimer, the term of this patent is extended or adjusted under 35 U.S.C. 154(b) by 168 days.

(21) Appl. No.: 16/307,502

(22) PCT Filed: Jun. 8, 2017

(86) PCT No.: PCT/JP2017/021328
§ 371 (c)(1),
(2) Date: Dec. 6, 2018

(87) PCT Pub. No.: WO2017/213224
PCT Pub. Date: Dec. 14, 2017

(65) Prior Publication Data
US 2019/0219181 A1    Jul. 18, 2019

(30) Foreign Application Priority Data
Jun. 8, 2016 (JP) .............................. JP2016-114320

(51) Int. Cl.
*F16K 11/20* (2006.01)
*F16K 11/22* (2006.01)
(Continued)

(52) U.S. Cl.
CPC .............. *F16K 11/22* (2013.01); *F16K 27/00* (2013.01); *F16K 27/04* (2013.01); *F16K 27/06* (2013.01); *F16K 31/04* (2013.01); *F16K 27/0263* (2013.01)

(58) Field of Classification Search
CPC ...... F16K 11/22; F16K 27/041; F16K 27/065; F16K 11/085; F16K 19/006; F25B 41/04
See application file for complete search history.

(56) References Cited

U.S. PATENT DOCUMENTS 4,013,094 A    3/1977 Niskanen
4,628,962 A *  12/1986 Pezzarossi ............ F16K 11/085
                                                           137/597
(Continued)

FOREIGN PATENT DOCUMENTS

| CN | 103782074 A | 5/2014 |
| JP | S51065427 A | 6/1976 |
| JP | 2011043188 A | 3/2011 |

*Primary Examiner* — Reinaldo Sanchez-Medina
(74) *Attorney, Agent, or Firm* — Harness, Dickey & Pierce, P.L.C.

(57) ABSTRACT

A housing includes a plurality of valve element housing holes rotatably house valve elements therein, and a plurality of fluid passage holes, each of the fluid passage holes having one end connected to a peripheral wall surface of one of the valve element housing holes and the other end open on an outer wall surface of the housing to circulate fluids. Axes of the valve element housing holes are parallel to each other. Axes of the fluid passage holes are parallel to each other and perpendicular to the axes of the valve element housing holes. Each of the fluid passage holes is connected to at least two of the valve element housing holes, and has a perpendicular-to-axis cross section partially or entirely overlapping the at least two valve element housing holes in an axial direction of the fluid passage hole.

10 Claims, 10 Drawing Sheets

(51) Int. Cl.
*F16K 27/04* (2006.01)
*F16K 27/06* (2006.01)
*F16K 27/00* (2006.01)
*F16K 31/04* (2006.01)
*F16K 27/02* (2006.01)

(56) References Cited

U.S. PATENT DOCUMENTS

| | | | | |
|---|---|---|---|---|
| 4,688,273 | A | * | 8/1987 | Lyng ........................ E03C 1/023 4/668 |
| 7,344,088 | B2 | * | 3/2008 | Yang ..................... G05D 23/136 236/12.2 |
| 2006/0231637 | A1 | * | 10/2006 | Schmitt ................. B01F 5/0268 236/12.11 |
| 2014/0238073 | A1 | | 8/2014 | Ohno et al. |

\* cited by examiner

SWITCH VALVE

CROSS REFERENCE TO RELATED APPLICATIONS

This application is a U.S. National Phase Application under 35 U.S.C. 371 of International Application No. PCT/JP2017/021328 filed on Jun. 8, 2017. This application is based on and claims the benefit of priority from Japanese Patent Application No. 2016-114320 filed on Jun. 8, 2016. The entire disclosures of all of the above applications are incorporated herein by reference.

TECHNICAL FIELD

The present disclosure relates to a switch valve having plural valve elements.

BACKGROUND ART

For example, as this type of conventional switch valve, there is a switch valve described in Patent Literature 1. The switch valve described in Patent Literature 1 includes a plurality of valve units which are basic elements and coupled to each other. The switch valve controls flows of two kinds of fluids to a plurality of external devices by a plurality of valve elements each of which is housed in a valve element housing hole of a housing.

The housing of the switch valve includes a first fluid passage hole, a second fluid passage hole, and a third fluid passage hold. The first fluid passage hole extends in a substantially tangential direction with respect to the valve element housing hole, and is connected to a peripheral wall surface of the valve element housing hole. The second fluid passage hole extends in a direction perpendicular to both an axis of the valve element housing hole and an axis of the first fluid passage hole, and is connected to the peripheral wall surface of the valve element housing hole. The third fluid passage hole is connected to a wall surface of the valve element housing hole on one end in the axial direction.

The axis of the first fluid passage hole is perpendicular to the axis of the valve element housing hole. Further, a perpendicular-to-axis cross section of the first fluid passage hole partially overlaps the valve element housing hole in an axial direction view of the first fluid passage hole.

On the other hand, an axis of the second fluid passage hole is perpendicular to both the axis of the valve element housing hole and the axis of the first fluid passage hole. Thus, a perpendicular-to-axis cross section of the second fluid passage hole entirely overlaps the valve element housing hole in an axial direction view of the second fluid passage hole.

PRIOR ART LITERATURES

Patent Literature

Patent Literature 1: JP 2011-43188 A

SUMMARY OF INVENTION

According to studies made by the inventor of the present disclosure, since the axes of the first and the second fluid passage holes each of which is connected to the peripheral wall surface of the valve element housing hole are perpendicular to each other in the conventional switch valve, the size of the housing of the switch valve disadvantageously increases.

It is an object of the present disclosure to provide a switch valve having plural valve elements, in which a housing can be downsized.

According to an aspect of the present disclosure, a switch valve that controls flows of two kinds of fluids to a plurality of external devices includes: a housing; and a plurality of valve elements that are housed in the housing and switch the flows of the two kinds of fluid by rotation around respective axes. The housing includes a plurality of valve element housing holes that have a cylindrical shape and rotatably house the valve elements therein, and a plurality of fluid passage holes each having a linear shape, each of the fluid passage holes having one end connected to a peripheral wall surface of one of the valve element housing holes and the other end open on an outer wall surface of the housing to circulate the fluids. Axes of the valve element housing holes are parallel to each other. Axes of the fluid passage holes are parallel to each other and perpendicular to the axes of the valve element housing holes. Each of the fluid passage holes is connected to at least two of the valve element housing holes, and has a perpendicular-to-axis cross section partially or entirely overlapping the at least two valve element housing holes in an axial direction of the fluid passage hole.

According to the above aspect, in the switch valve including the plurality of valve elements, the axes of the plurality of fluid passage holes connected to the peripheral wall surfaces of the plurality of valve element housing holes can be made parallel to each other. Thus, it is possible to downsize the housing of the switch valve including the plurality of valve elements.

DESCRIPTION OF EMBODIMENTS

Embodiment

An embodiment of the present disclosure is explained.

Figure 1:
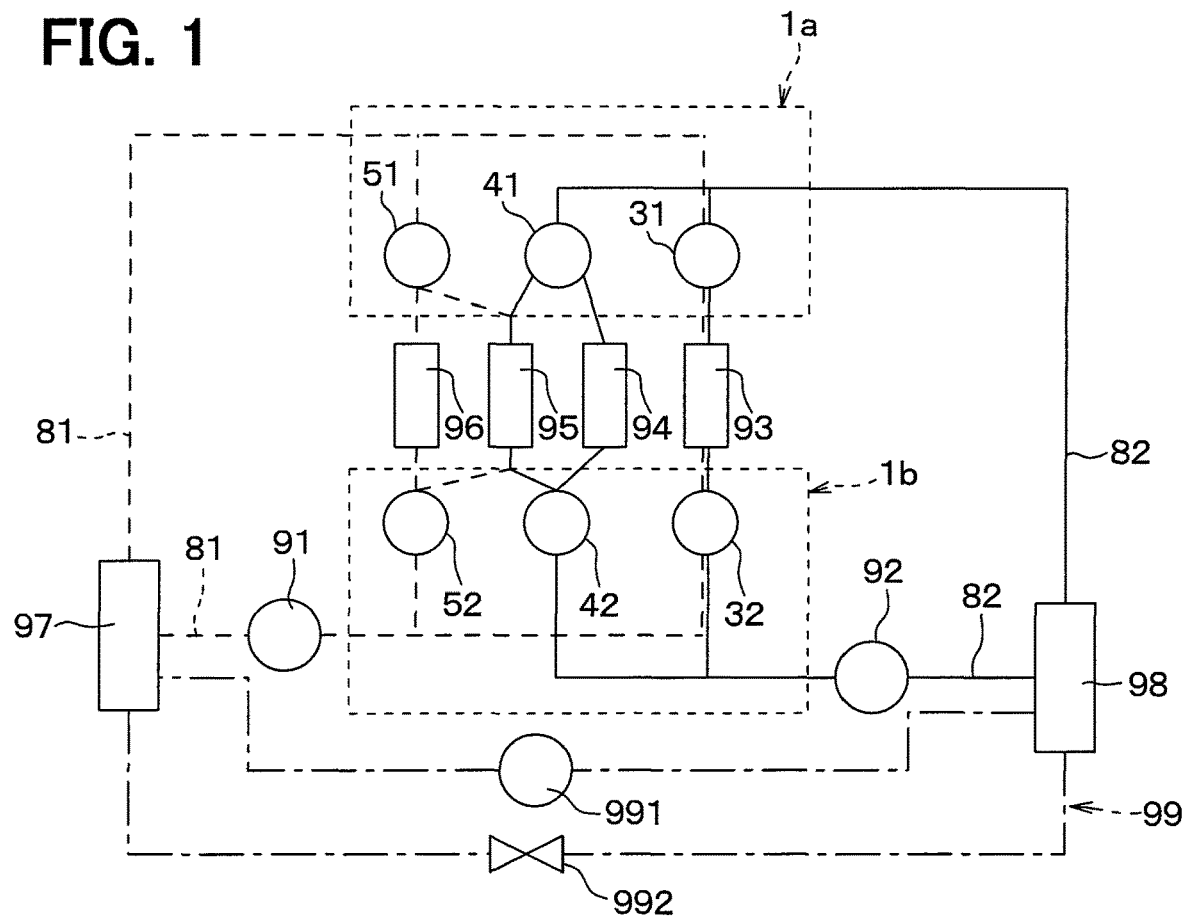
FIG. 1 is a view illustrating a heat management system using a switch valve according to an embodiment.
Figure 2:
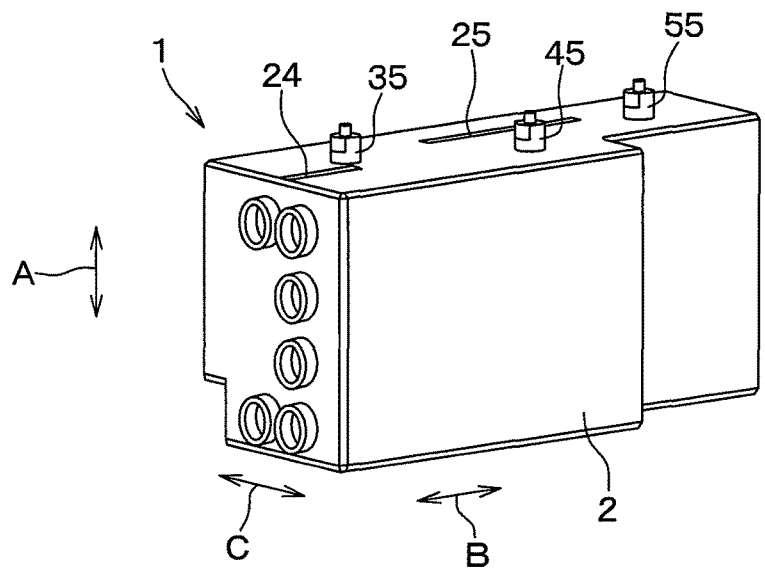
FIG. 2 is a perspective view illustrating the switch valve of the embodiment.

A heat management system illustrated in FIG. 1 is used for adjusting various devices included in a vehicle and the inside of a cabin to appropriate temperatures.

As illustrated in FIG. 1, the heat management system includes a first pump 91, a second pump 92, a radiator 93, a heater core 94, a battery temperature control heat exchanger 95, a cooler core 96, a water cooler 97, a water heater 98, a distribution switch valve 1a, a collection switch valve 1b, and a refrigeration cycle 99.

The first pump 91 and the second pump 92 are electric pumps each of which sucks and discharges water. The water is a fluid as a heating medium.

The radiator 93, the heater core 94, the battery temperature control heat exchanger 95, the cooler core 96, the water cooler 97, and the water heater 98 are water circulation devices through which water circulates.

The refrigeration cycle 99 is a vapor compression refrigerator which includes a compressor 991, the water heater 98, an expansion valve 992, and the water cooler 97.

The compressor 991 sucks, compresses, and discharges a refrigerant of the refrigeration cycle 99.

The water heater 98 exchanges heat between a high-pressure side refrigerant discharged from the compressor 991 and water to condense the high-pressure side refrigerant. The water heater 98 heats the water by the heat exchange. Hereinbelow, the water heated by the water heater 98 is referred to as hot water. The water heater 98 constitutes a condenser of the refrigeration cycle 99.

The expansion valve 992 depressurizes and expands a liquid-phase refrigerant flowing out of the water heater 98.

The water cooler 97 exchanges heat between a low pressure refrigerant depressurized and expanded by the expansion valve 992 and water to evaporate the low pressure refrigerant. The water cooler 97 cools the water by the heat exchange. Hereinbelow, the water cooled by the water cooler 97 is referred to as cold water. The water cooler 97 constitutes an evaporator of the refrigeration cycle 99.

A gaseous-phase refrigerant evaporated by the water cooler 97 is sucked into the compressor 991 and compressed.

The radiator 93 exchanges heat between the water having a temperature regulated by the water cooler 97 or the water heater 98 and air outside the cabin (hereinbelow, referred to as the outside air). Water having a temperature higher than an outside air temperature passes through the radiator 93, such that heat can be radiated to the outside air from the water. Water having a temperature lower than the outside air temperature passes through the radiator 93, such that heat can be absorbed to the water from the outside air. In other words, the radiator 93 is capable of exhibiting a function as a radiator which radiates heat to the outside air from the water and a function as a heat absorber which absorbs heat to the water from the outside air.

The distribution switch valve 1a, the collection switch valve 1b, the first pump 91, and the water cooler 97 are connected through a first pump passage 81. Water flowing out of the collection switch valve 1b is supplied to the distribution switch valve 1a through the first pump 91 and the water cooler 97.

The distribution switch valve 1a, the collection switch valve 1b, the second pump 92, and the water heater 98 are connected through a second pump passage 82. Water flowing out of the collection switch valve 1b is supplied to the distribution switch valve 1a through the second pump 92 and the water heater 98.

The radiator 93, the heater core 94, the battery temperature control heat exchanger 95, and the cooler core 96 are connected to the distribution switch valve 1a and the collection switch valve 1b.

The distribution switch valve 1a appropriately supplies hot water or cold water supplied through the first pump passage 81 or the second pump passage 82 to the radiator 93, the heater core 94, the battery temperature control heat exchanger 95, and the cooler core 96. Details of the distribution switch valve 1a will be described below.

The collection switch valve 1b appropriately returns hot water or cold water discharged from the radiator 93, the heater core 94, the battery temperature control heat exchanger 95, and the cooler core 96 to the first pump 91 or the second pump 92. Details of the collection switch valve 1b will be described below.

The heater core 94 exchanges heat between the supplied hot water and air blown into the cabin to heat the air blown into the cabin.

The cooler core 96 exchanges heat between the supplied cold water and air blown into the cabin to cool the air blown into the cabin.

The battery temperature control heat exchanger 95 exchanges heat between the supplied hot or cold water and a battery (not illustrated) to control the temperature of the battery.

Next, detailed configurations of the distribution switch valve 1a and the collection switch valve 1b will be described with reference to FIGS. 2 to 10.

As illustrated in FIGS. 2 to 10, the distribution switch valve 1a and the collection switch valve 1b of the heat management system illustrated in FIG. 1 are integrated as a switch valve 1.

The switch valve 1 includes a housing 2, a first valve element 3, a second valve element 4, and a third valve element 5. The housing 2, the first valve element 3, the second valve element 4, and the third valve element 5 are all made of metal or resin.

Figure 3:
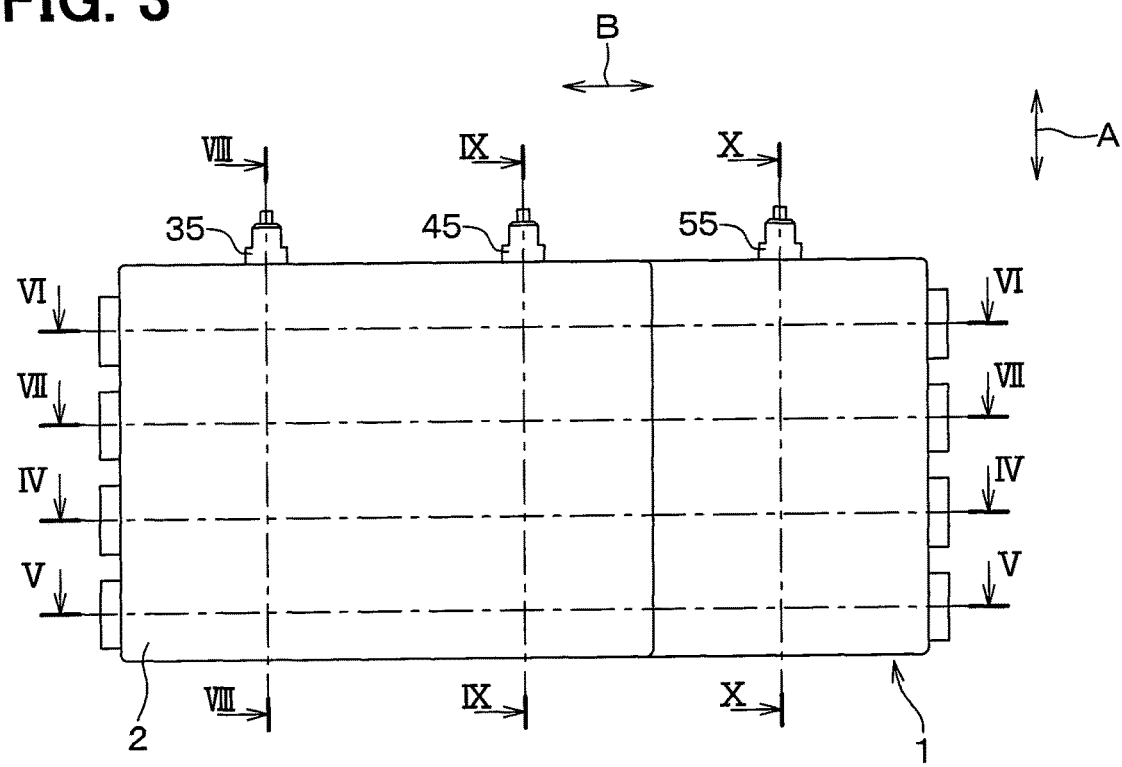
FIG. 3 is a front view illustrating the switch valve of the embodiment.

In the following description, an up-down direction on the sheet of FIG. 3 is referred to as a housing height direction A, a right-left direction on the sheet of FIG. 3 is referred to as a housing width direction B, and a vertical direction on the sheet of FIG. 3 is referred to as a housing depth direction C. The housing height direction A and the housing width direction B are perpendicular to each other. The housing depth direction C is perpendicular to both the housing height direction A and the housing width direction B. The housing height direction A corresponds to a top-bottom direction when the valve 1 is mounted on the vehicle. The housing width direction B and the housing depth direction C correspond to a horizontal direction when the valve 1 is mounted on the vehicle.

As illustrated in FIGS. 4, and 7 to 10, the housing 2 includes a first valve element housing hole 21, a second valve element housing hole 22, and a third valve element housing hole 23. The first valve element housing hole 21 is a cylindrical space in which the first valve element 3 is rotatably housed. The second valve element housing hole 22 is a cylindrical space in which the second valve element 4 is rotatably housed. The third valve element housing hole 23 is a cylindrical space in which the third valve element 5 is rotatably housed.

An axis of the first valve element housing hole 21, an axis of the second valve element housing hole 22, and an axis of the third valve element housing hole 23 are parallel to each other, and extend in the housing height direction A. The first valve element housing hole 21, the second valve element housing hole 22, and the third valve element housing hole 23 are located at the same position in the housing height direction A.

The first valve element housing hole 21 and the third valve element housing hole 23 are disposed with a predetermined distance therebetween in the housing width direction B.

The second valve element housing hole 22 is disposed substantially midway between the first valve element housing hole 21 and the third valve element housing hole 23 in the housing width direction B and shifted by a predetermined distance in the housing depth direction C with respect to the first valve element housing hole 21 and the third valve element housing hole 23.

Figure 4:
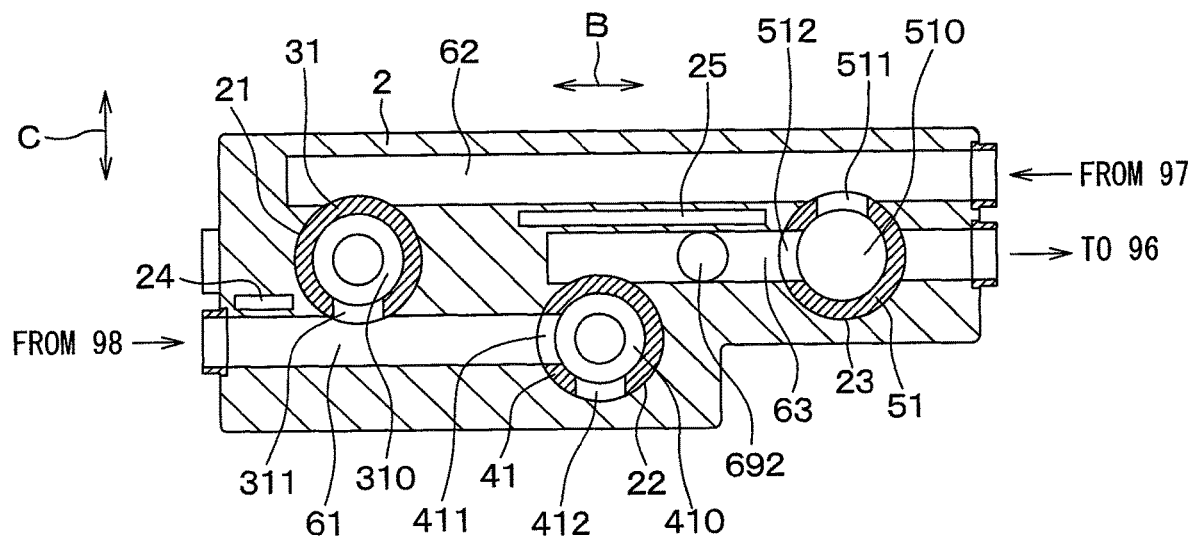
FIG. 4 is a cross-sectional view taken along a line IV-IV of FIG. 3.
Figure 7:
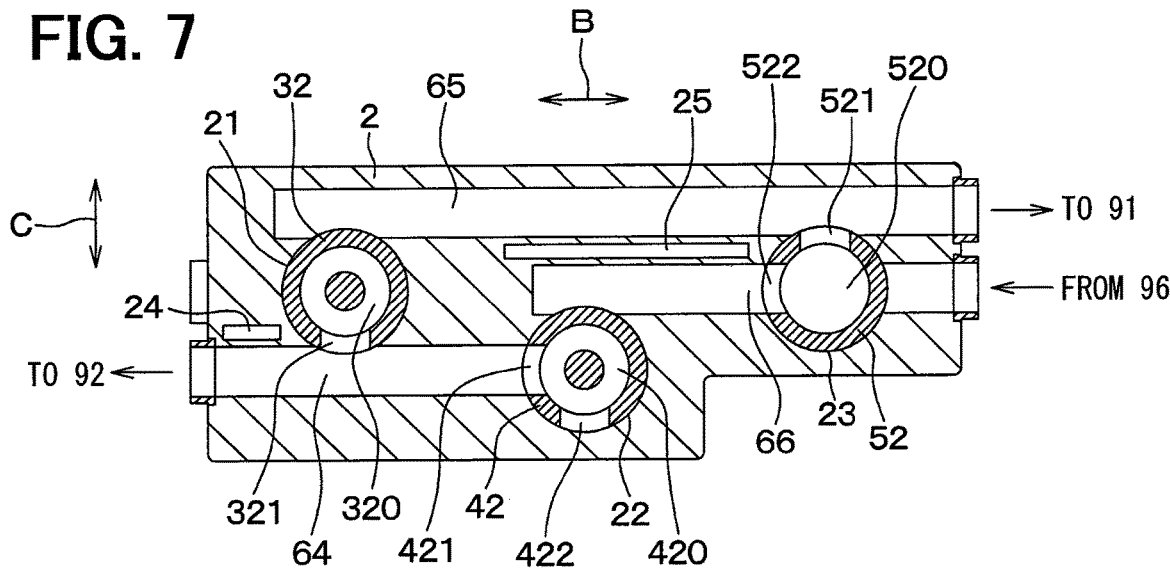
FIG. 7 is a cross-sectional view taken along a line VII-VII of FIG. 3.
Figure 8:
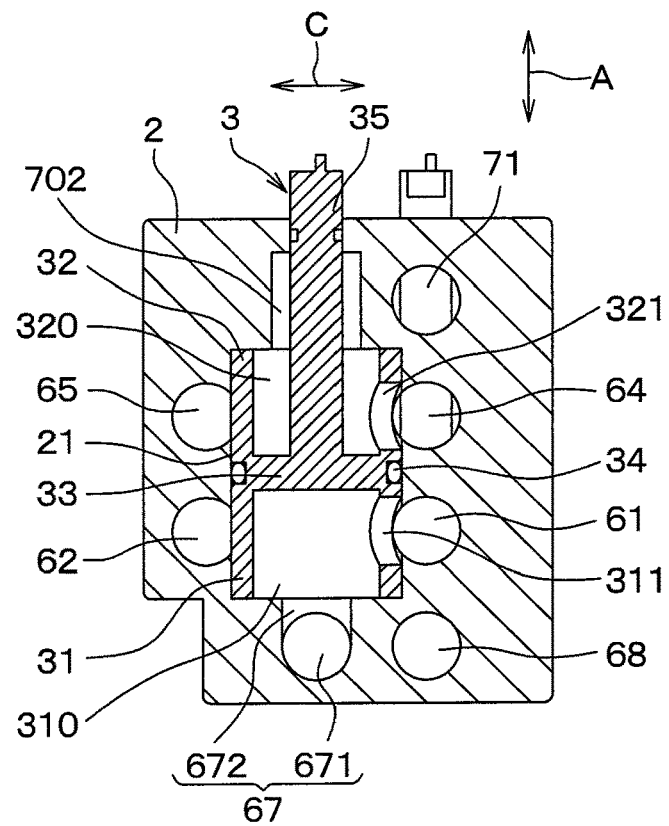
FIG. 8 is a cross-sectional view taken along a line VIII-VIII of FIG. 3.

As illustrated in FIGS. 4, 7, and 8, in the first valve element 3, a first distribution valve 31 having a cylindrical shape and a first collection valve 32 having a cylindrical shape are integrated together. As is obvious from FIG. 8, in the first valve element 3, a lower part in the housing height direction A constitutes the first distribution valve 31, and an upper part in the housing height direction A constitutes the first collection valve 32. As described in detail below, it is possible to control the flow of a fluid to an external device by rotating the first valve element 3 around the central axis thereof.

A first distribution valve chamber 310 which is a space inside the first distribution valve 31 and a first collection valve chamber 320 which is a space inside the first collection valve 32 are separated from each other by a first valve partition wall 33. A first valve seal member 34 which seals the first distribution valve 31 side and the first collection valve 32 side is attached to the outer peripheral side of the first valve element 3. For example, an O-ring can be employed as the first valve seal member 34.

The first distribution valve 31 includes a first distribution valve first hole 311 which allows the outer peripheral side of the first distribution valve 31 and the first distribution valve chamber 310 to communicate with each other.

The first collection valve 32 includes a first collection valve first hole 321 which allows the outer peripheral side of the first collection valve 32 and the first collection valve chamber 320 to communicate with each other.

The first valve element 3 includes a first valve shaft 35 which extends upward from the first valve partition wall 33. The upper end side of the first valve shaft 35 projects to the outside of the housing 2. An actuator (not illustrated) which rotates the first valve element 3 is coupled to the upper end of the first valve shaft 35. The actuator may be, for example, a single electric motor or a combination of an electric motor with a deceleration mechanism.

Figure 9:
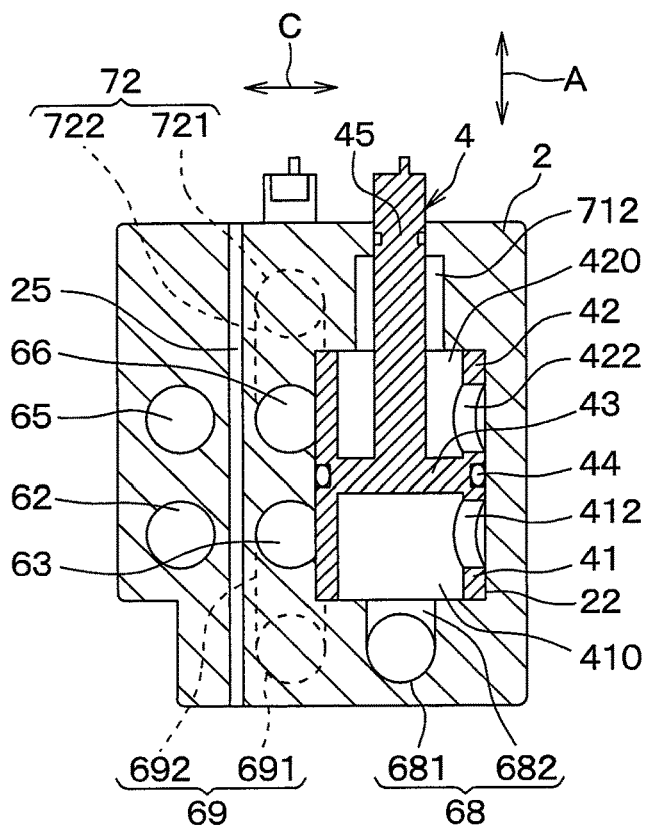
FIG. 9 is a cross-sectional view taken along a line IX-IX of FIG. 3.

As illustrated in FIGS. 4, 7, and 9, in the second valve element 4, a second distribution valve 41 having a cylindrical shape and a second collection valve 42 having a cylindrical shape are integrated together. In the second valve element 4, a lower part in the housing height direction A constitutes the second distribution valve 41, and an upper part in the housing height direction A constitutes the second collection valve 42. As described in detail below, it is possible to control the flow of a fluid to an external device by rotating the second valve element 4 around the central axis thereof.

A second distribution valve chamber 410 which is a space inside the second distribution valve 41 and a second collection valve chamber 420 which is a space inside the second collection valve 42 are separated from each other by a second valve partition wall 43. A second valve seal member 44 which seals the second distribution valve 41 side and the second collection valve 42 side is attached to the outer peripheral side of the second valve element 4. For example, an O-ring can be employed as the second valve seal member 44.

The second distribution valve 41 includes a second distribution valve first hole 411 and a second distribution valve second hole 412 which allow the outer peripheral side of the second distribution valve 41 and the second distribution valve chamber 410 to communicate with each other. The second distribution valve first hole 411 and the second distribution valve second hole 412 are shifted by 90° with respect to each other in a rotation direction of the second valve element 4.

The second collection valve 42 includes a second collection valve first hole 421 and a second collection valve second hole 422 which allow the outer peripheral side of the second collection valve 42 and the second collection valve chamber 420 to communicate with each other. The second collection valve first hole 421 and the second collection valve second hole 422 are shifted by 90° with respect to each other in the rotation direction of the second valve element 4.

The second valve element 4 includes a second valve shaft 45 which extends upward from the second valve partition wall 43. The upper end side of the second valve shaft 45 projects to the outside of the housing 2. An actuator (not illustrated) which rotates the second valve element 4 is coupled to the upper end of the second valve shaft 45. The actuator may be, for example, a single electric motor or a combination of an electric motor with a deceleration mechanism.

Figure 10:
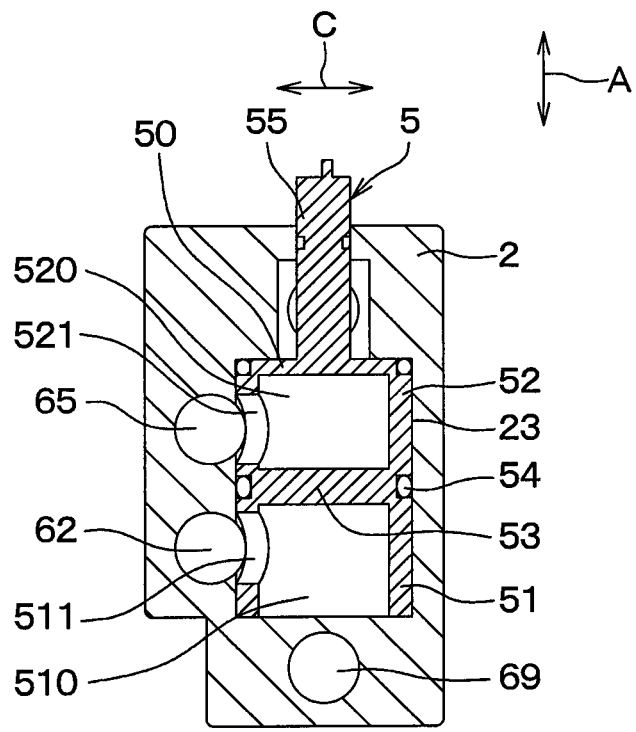
FIG. 10 is a cross-sectional view taken along a line X-X of FIG. 3.

As illustrated in FIGS. 4, 7, and 10, in the third valve element 5, a third distribution valve 51 having a cylindrical shape and a third collection valve 52 having a cylindrical shape are integrated together. In the third valve element 5, a lower part in the housing height direction A constitutes the third distribution valve 51, and an upper part in the housing height direction A constitutes the third collection valve 52. As described in detail below, it is possible to control the flow of a fluid to an external device by rotating the third valve element 5 around the central axis thereof.

An end of the third valve element 5 is closed by a third valve bottom wall 50 at the side corresponding to the third collection valve 52. A third distribution valve chamber 510 which is a space inside the third distribution valve 51 and a third collection valve chamber 520 which is a space inside the third collection valve 52 are separated from each other by a third valve partition wall 53.

A third valve seal member 54 which seals the third distribution valve 51 side and the third collection valve 52 side is attached to the outer peripheral side of the third valve element 5. For example, an O-ring can be employed as the third valve seal member 54.

The third distribution valve 51 includes a third distribution valve first hole 511 and a third distribution valve second hole 512 which allow the inner peripheral side and the outer peripheral side of the third distribution valve 51 to communicate with each other. The third distribution valve first hole 511 and the third distribution valve second hole 512 are shifted by 90° with respect to each other in a rotation direction of the third valve element 5.

The third collection valve 52 includes a third collection valve first hole 521 and a third collection valve second hole 522 which allow the inner peripheral side and the outer peripheral side of the third collection valve 52 to communicate with each other. The third collection valve first hole 521 and the third collection valve second hole 522 are shifted by 90° with respect to each other in the rotation direction of the third valve element 5.

The third valve element 5 includes a third valve shaft 55 which extends upward from the third valve bottom wall 50. The upper end side of the third valve shaft 55 projects to the outside of the housing 2. An actuator (not illustrated) which rotates the third valve element 5 is coupled to the upper end of the third valve shaft 55. The actuator may be, for example, a single electric motor or a combination of an electric motor with a deceleration mechanism.

As illustrated in FIGS. 4 to 10, the housing 2 includes a plurality of fluid passage holes 61 to 72 though which a fluid is circulated. In the fluid passage holes 61 to 72, the first to sixth fluid passage holes 61 to 66 correspond to fluid passage holes of the present disclosure.

Each of the first to sixth fluid passage holes 61 to 66 is a hole having a linear shape, and has one end connected to peripheral wall surfaces of the first to third valve element housing holes 21 to 23 and the other end open on an outer wall surface of the housing 2. Axes of the first to sixth fluid passage holes 61 to 66 are parallel to each other and perpendicular to the axes of the first to third valve element housing holes 21 to 23, and extend in the housing width direction B. Each of the first to sixth fluid passage holes 61 to 66 is connected to at least two of the first to third valve element housing holes 21 to 23.

As illustrated in FIGS. 4, and 8 to 10, the first fluid passage hole 61 is open on the outer wall surface of the housing 2 at the left end side in the housing width direction B (that is, the left side on the sheet of FIG. 4). Hot water is supplied to the first fluid passage hole 61 from the water heater 98 illustrated in FIG. 1. The first fluid passage hole 61 is connected to a part of the first valve element housing hole 21 in which the first distribution valve 31 is housed and a part of the second valve element housing hole 22 in which the second distribution valve 41 is housed.

More specifically, the first fluid passage hole 61 is connected to the first valve element housing hole 21 in such a manner that a perpendicular-to-axis cross section of the first fluid passage hole 61 partially overlaps the first valve element housing hole 21 in an axial direction view of the first fluid passage hole 61. That is, the perpendicular-to-axis cross section of the first fluid passage hole 61 partially overlaps the first valve element housing hole 21 in the axial direction of the first fluid passage hole 61. The perpendicular-to-axis cross section of the first fluid passage hole 61 is a part of a plane perpendicular to the axis of the first fluid passage hole 61, the part being included in the first fluid passage hole 61. The first fluid passage hole 61 is connected to a part of the peripheral wall surface of the first valve element housing hole 21 at the front side in the housing depth direction C (that is, the lower side on the sheet of FIG. 4).

The first fluid passage hole 61 is connected to the second valve element housing hole 22 in such a manner that the perpendicular-to-axis cross section of the first fluid passage hole 61 entirely overlaps the second valve element housing hole 22 in the axial direction view of the first fluid passage hole 61. That is, the perpendicular-to-axis cross section of the first fluid passage hole 61 entirely overlaps the second valve element housing hole 22 in the axial direction of the first fluid passage hole 61. The axis of the first fluid passage hole 61 is perpendicular to the axis of the second valve element housing hole 22.

The second fluid passage hole 62 is open on the outer wall surface of the housing 2 at the right end side in the housing width direction B (that is, the right side on the sheet of FIG. 4). Cold water is supplied to the second fluid passage hole 62 from the water cooler 97 illustrated in FIG. 1. The second fluid passage hole 62 is connected to a part of the first valve element housing hole 21 in which the first distribution valve 31 is housed and a part of the third valve element housing hole 23 in which the third distribution valve 51 is housed.

More specifically, the second fluid passage hole 62 is connected to the first valve element housing hole 21 in such a manner that a perpendicular-to-axis cross section of the second fluid passage hole 62 partially overlaps the first valve element housing hole 21 in an axial direction view of the second fluid passage hole 62. That is, the perpendicular-to-axis cross section of the second fluid passage hole 62 partially overlaps the first valve element housing hole 21 in the axial direction of the second fluid passage hole 62. The perpendicular-to-axis cross section of the second fluid passage hole 62 is a part of a plane perpendicular to the axis of the second fluid passage hole 62, the part being included in the second fluid passage hole 62. Similarly, the second fluid passage hole 62 is connected to the third valve element housing hole 23 in such a manner that the perpendicular-to-axis cross section of the second fluid passage hole 62 partially overlaps the third valve element housing hole 23 in the axial direction view of the second fluid passage hole 62. That is, the perpendicular-to-axis cross section of the second fluid passage hole 62 partially overlaps the third valve element housing hole 23 in the axial direction of the second fluid passage hole 62.

The second fluid passage hole 62 is connected to a part of the peripheral wall surface of the first valve element housing hole 21 at the back side in the housing depth direction C (that is, the upper side on the sheet of FIG. 4). Similarly, the second fluid passage hole 62 is connected to a part of the peripheral wall surface of the third valve element housing hole 23 at the back side in the housing depth direction C.

The third fluid passage hole 63 is open on the outer wall surface of the housing 2 at the right end side in the housing width direction B and connected to a fluid inlet of the cooler core 96 illustrated in FIG. 1. The third fluid passage hole 63 is connected to a part of the second valve element housing hole 22 in which the second distribution valve 41 is housed and a part of the third valve element housing hole 23 in which the third distribution valve 51 is housed.

More specifically, the third fluid passage hole 63 is connected to the second valve element housing hole 22 in such a manner that a perpendicular-to-axis cross section of the third fluid passage hole 63 partially overlaps the second valve element housing hole 22 in an axial direction view of the third fluid passage hole 63. That is, the perpendicular-to-axis cross section of the third fluid passage hole 63 partially overlaps the second valve element housing hole 22 in the axial direction of the third fluid passage hole 63. The perpendicular-to-axis cross section of the third fluid passage hole 63 is a part of a plane perpendicular to the axis of the third fluid passage hole 63, the part being included in the second fluid passage hole 62.

Further, the third fluid passage hole 63 is connected to the third valve element housing hole 23 in such a manner that the perpendicular-to-axis cross section of the third fluid passage hole 63 entirely overlaps the third valve element housing hole 23 in the axial direction view of the third fluid passage hole 63. That is, the perpendicular-to-axis cross section of the third fluid passage hole 63 entirely overlaps the third valve element housing hole 23 in the axial direction of the third fluid passage hole 63. The axis of the third fluid passage hole 63 is perpendicular to the axis of the third valve element housing hole 23.

In the first fluid passage hole 61, the second fluid passage hole 62, and the third fluid passage hole 63, the first fluid passage hole 61 is disposed on the frontmost side in the housing depth direction C, and the second fluid passage hole 62 is disposed on the backmost side in the housing depth direction C. In the housing depth direction C, the third fluid passage hole 63 is disposed midway between the first fluid passage hole 61 and the second fluid passage hole 62. The first fluid passage hole 61, the second fluid passage hole 62, and the third fluid passage hole 63 are located at the same position in the housing height direction A.

As illustrated in FIGS. 7 to 10, the fourth fluid passage hole 64 is open on the outer wall surface of the housing 2 at the left end side in the housing width direction B and connected to a fluid inlet of the second pump 92 illustrated in FIG. 1. The fourth fluid passage hole 64 is connected to a part of the first valve element housing hole 21 in which the first collection valve 32 is housed and a part of the second valve element housing hole 22 in which the second collection valve 42 is housed.

More specifically, the fourth fluid passage hole 64 is connected to the first valve element housing hole 21 in such a manner that a perpendicular-to-axis cross section of the fourth fluid passage hole 64 partially overlaps the first valve element housing hole 21 in an axial direction view of the fourth fluid passage hole 64. That is, the perpendicular-to-axis cross section of the fourth fluid passage hole 64 partially overlaps the first valve element housing hole 21 in the axial direction of the fourth fluid passage hole 64. The perpendicular-to-axis cross section of the fourth fluid passage hole 64 is a part of a plane perpendicular to the axis of the fourth fluid passage hole 64, the part being included in the fourth fluid passage hole 64. The fourth fluid passage hole 64 is connected to a part of the peripheral wall surface of the first valve element housing hole 21 at the front side in the housing depth direction C.

The fourth fluid passage hole 64 is connected to the second valve element housing hole 22 in such a manner that the perpendicular-to-axis cross section of the fourth fluid passage hole 64 entirely overlaps the second valve element housing hole 22 in the axial direction view of the fourth fluid passage hole 64. That is, the perpendicular-to-axis cross section of the fourth fluid passage hole 64 entirely overlaps the second valve element housing hole 22 in the axial direction of the fourth fluid passage hole 64. The axis of the fourth fluid passage hole 64 is perpendicular to the axis of the second valve element housing hole 22.

The fifth fluid passage hole 65 is open on the outer wall surface of the housing 2 at the right end side in the housing width direction B and connected to a fluid inlet of the first pump 91 illustrated in FIG. 1. The fifth fluid passage hole 65 is connected to a part of the first valve element housing hole 21 in which the first collection valve 32 is housed and a part of the third valve element housing hole 23 in which the third collection valve 52 is housed.

More specifically, the fifth fluid passage hole 65 is connected to the first valve element housing hole 21 in such a manner that a perpendicular-to-axis cross section of the fifth fluid passage hole 65 partially overlaps the first valve element housing hole 21 in an axial direction view of the fifth fluid passage hole 65. That is, the perpendicular-to-axis cross section of the fifth fluid passage hole 65 partially overlaps the first valve element housing hole 21 in the axial direction of the fifth fluid passage hole 65. The perpendicular-to-axis cross section of the fifth fluid passage hole 65 is a part of a plane perpendicular to the axis of the fifth fluid passage hole 65, the part being included in the fifth fluid passage hole 65. Similarly, the fifth fluid passage hole 65 is connected to the third valve element housing hole 23 in such a manner that the perpendicular-to-axis cross section of the fifth fluid passage hole 65 partially overlaps the third valve element housing hole 23 in the axial direction view of the fifth fluid passage hole 65. That is, the perpendicular-to-axis cross section of the fifth fluid passage hole 65 partially overlaps the third valve element housing hole 23 in the axial direction of the fifth fluid passage hole 65.

The fifth fluid passage hole 65 is connected to a part of the peripheral wall surface of the first valve element housing hole 21 at the back side in the housing depth direction C. Similarly, the fifth fluid passage hole 65 is connected to a part of the peripheral wall surface of the third valve element housing hole 23 at the back side in the housing depth direction C.

The sixth fluid passage hole 66 is open on the outer wall surface of the housing 2 at the right end side in the housing width direction B and connected to a fluid outlet of the cooler core 96. The sixth fluid passage hole 66 is connected to a part of the second valve element housing hole 22 in which the second collection valve 42 is housed and a part of the third valve element housing hole 23 in which the third collection valve 52 is housed.

More specifically, the sixth fluid passage hole 66 is connected to the second valve element housing hole 22 in such a manner that a perpendicular-to-axis cross section of the sixth fluid passage hole 66 partially overlaps the second valve element housing hole 22 in an axial direction view of the sixth fluid passage hole 66. That is, the perpendicular-to-axis cross section of the sixth fluid passage hole 66 partially overlaps the second valve element housing hole 22 in the axial direction of the sixth fluid passage hole 66. The perpendicular-to-axis cross section of the sixth fluid passage hole 66 is a part of a plane perpendicular to the axis of the sixth fluid passage hole 66, the part being included in sixth fluid passage hole 66.

Further, the sixth fluid passage hole 66 is connected to the third valve element housing hole 23 in such a manner that the perpendicular-to-axis cross section of the sixth fluid passage hole 66 entirely overlaps the third valve element housing hole 23 in the axial direction view of the sixth fluid passage hole 66. That is, the perpendicular-to-axis cross section of the sixth fluid passage hole 66 entirely overlaps the third valve element housing hole 23 in the axial direction of the sixth fluid passage hole 66. The axis of the sixth fluid passage hole 66 is perpendicular to the axis of the third valve element housing hole 23.

In the fourth fluid passage hole 64, the fifth fluid passage hole 65, and the sixth fluid passage hole 66, the fourth fluid passage hole 64 is disposed on the frontmost side in the housing depth direction C, and the fifth fluid passage hole 65 is disposed on the backmost side in the housing depth direction C. In the housing depth direction C, the sixth fluid passage hole 66 is disposed midway between the fourth fluid passage hole 64 and the fifth fluid passage hole 65. The fourth fluid passage hole 64, the fifth fluid passage hole 65, and the sixth fluid passage hole 66 are located at the same position in the housing height direction A.

As illustrated in FIGS. 5, and 8 to 10, the seventh fluid passage hole 67 includes a part 671 which extends in the housing width direction B and a part 672 which extends in the housing height direction A. In the seventh fluid passage hole 67, the part 671 which extends in the housing width direction B is open on the outer wall surface of the housing 2 at the left end side in the housing width direction B and connected to a fluid inlet of the radiator 93 illustrated in FIG. 1. In the seventh fluid passage hole 67, the part 672 which extends in the housing height direction A is open on an end wall surface of the first valve element housing hole 21 and connected to the first distribution valve chamber 310. As is obvious from FIGS. 5 and 8, the part 671 and the part 672 communicate with each other.

The eighth fluid passage hole 68 includes a part 681 which extends in the housing width direction B and a part 682 which extends in the housing height direction A. In the eighth fluid passage hole 68, the part 681 which extends in the housing width direction B is open on the outer wall surface of the housing 2 at the left end side in the housing width direction B and connected to a fluid inlet of the heater core 94 illustrated in FIG. 1. In the eighth fluid passage hole 68, the part 682 which extends in the housing height direction A is open on an end wall surface of the second valve element housing hole 22 and connected to the second distribution valve chamber 410. As is obvious from FIGS. 5 and 9, the part 681 and the part 682 communicate with each other.

The ninth fluid passage hole 69 includes a part 691 which extends in the housing width direction B and a part 692 which extends in the housing height direction A. In the ninth fluid passage hole 69, the part 691 which extends in the housing width direction B is open on the outer wall surface of the housing 2 at the right end side in the housing width direction B and connected to a fluid inlet of the battery temperature control heat exchanger 95 illustrated in FIG. 1. In the ninth fluid passage hole 69, the part 692 which extends in the housing height direction A is connected to a part of the third fluid passage hole 63, the part allowing the second valve element housing hole 22 and the third valve element housing hole 23 to communicate with each other. As is obvious from FIG. 9, the part 691 and the part 692 communicate with each other.

As illustrated in FIGS. 6, and 8 to 10, the tenth fluid passage hole 70 includes a part 701 which extends in the housing width direction B and a part 702 which extends in the housing height direction A. In the tenth fluid passage hole 70, the part 701 which extends in the housing width direction B is open on the outer wall surface of the housing 2 at the left end side in the housing width direction B and connected to a fluid outlet of the radiator 93. In the tenth fluid passage hole 70, the part 702 which extends in the housing height direction A is connected to the first collection valve chamber 320. As is obvious from FIG. 6, the part 701 and the part 702 communicate with each other.

The eleventh fluid passage hole 71 includes a part 711 which extends in the housing width direction B and a part 712 which extends in the housing height direction A. In the eleventh fluid passage hole 71, the part 711 which extends in the housing width direction B is open on the outer wall surface of the housing 2 at the left end side in the housing width direction B and connected to a fluid outlet of the heater core 94. In the eleventh fluid passage hole 71, the part 712 which extends in the housing height direction A is connected to the second collection valve chamber 420. As is obvious from FIG. 6, the part 711 and the part 712 communicate with each other.

The twelfth fluid passage hole 72 includes a part 721 which extends in the housing width direction B and a part 722 which extends in the housing height direction A. In the twelfth fluid passage hole 72, the part 721 which extends in the housing width direction B is open on the outer wall surface of the housing 2 at the right end side in the housing width direction B and connected to a fluid outlet of the battery temperature control heat exchanger 95. In the twelfth fluid passage hole 72, the part 722 which extends in the housing height direction A is connected to the sixth fluid passage hole 66. As is obvious from FIGS. 6 and 9, the part 721 and the part 722 communicate with each other.

As illustrated in FIGS. 4 to 7, and 9, the housing 2 includes a first heat insulating space 24 and a second heat insulating space 25 each of which penetrates the housing 2 from an upper end face to a lower end face in the housing height direction A.

Figure 5:
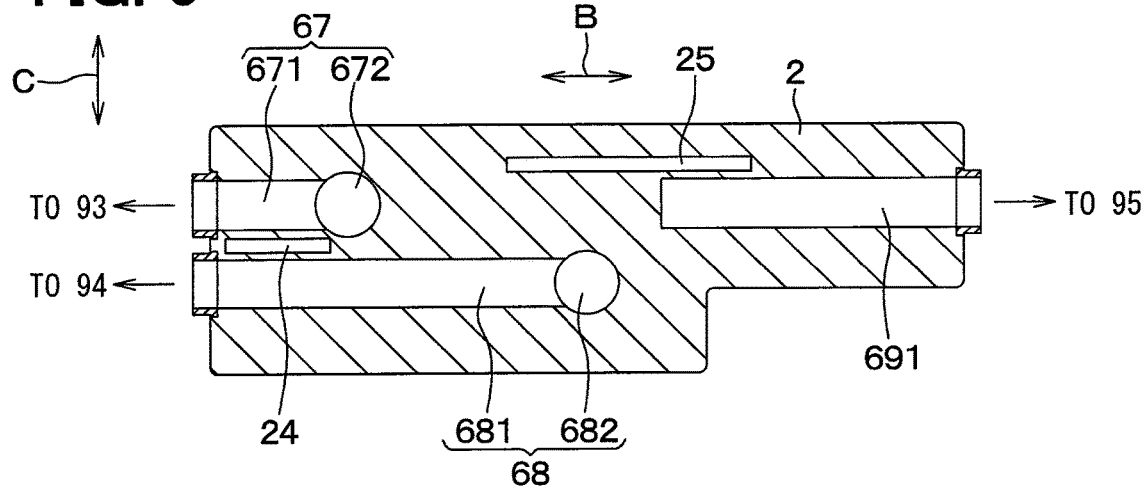
FIG. 5 is a cross-sectional view taken along a line V-V of FIG. 3.

As illustrated in FIG. 5, the first heat insulating space 24 is formed between the seventh fluid passage hole 67 and the eighth fluid passage hole 68. Air flowing through the first heat insulating space 24 reduces heat transfer between a fluid flowing through the seventh fluid passage hole 67 and a fluid flowing through the eighth fluid passage hole 68.

Figure 6:
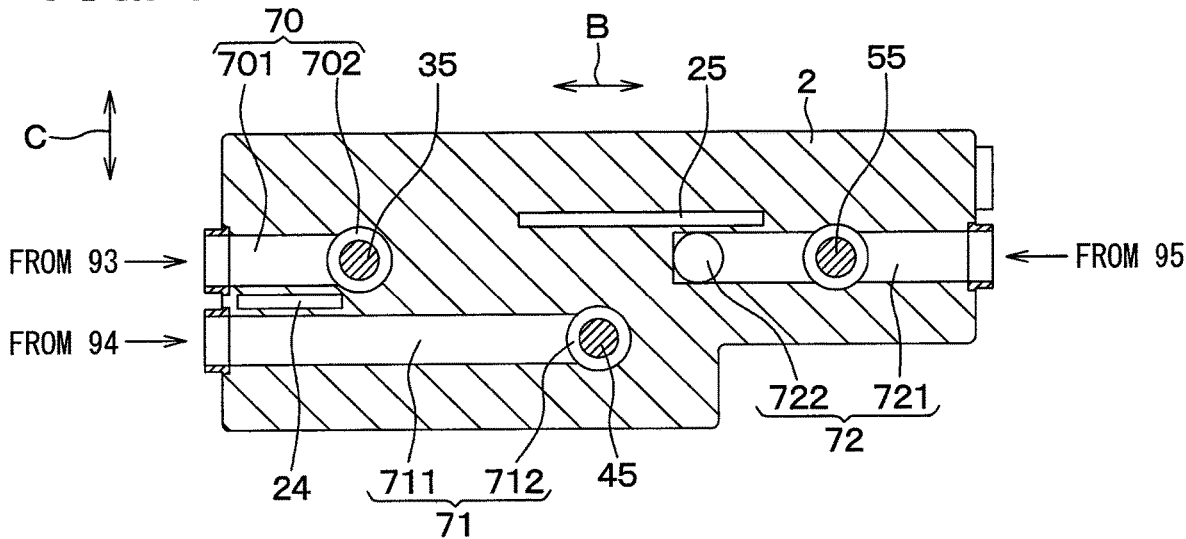
FIG. 6 is a cross-sectional view taken along a line VI-VI of FIG. 3.

As illustrated in FIG. 6, the first heat insulating space 24 is formed between the tenth fluid passage hole 70 and the eleventh fluid passage hole 71. Air flowing through the first heat insulating space 24 reduces heat transfer between a fluid flowing through the tenth fluid passage hole 70 and a fluid flowing through the eleventh fluid passage hole 71.

As illustrated in FIGS. 4 and 9, the second heat insulating space 25 is formed between the second fluid passage hole 62 and the third fluid passage hole 63. Air flowing through the second heat insulating space 25 reduces heat transfer between a fluid flowing through the second fluid passage hole 62 and a fluid flowing through the third fluid passage hole 63.

As illustrated in FIGS. 7 and 9, the second heat insulating space 25 is formed between the fifth fluid passage hole 65 and the sixth fluid passage hole 66. Air flowing through the second heat insulating space 25 reduces heat transfer between a fluid flowing through the fifth fluid passage hole 65 and a fluid flowing through the sixth fluid passage hole 66.

Next, valve characteristics of the first to third valve elements 3 to 5 will be described with reference to FIGS. 4 to 13. FIGS. 4 and 7 to 10 illustrate original positions of the first to third valve elements 3 to 5.

Figure 11:
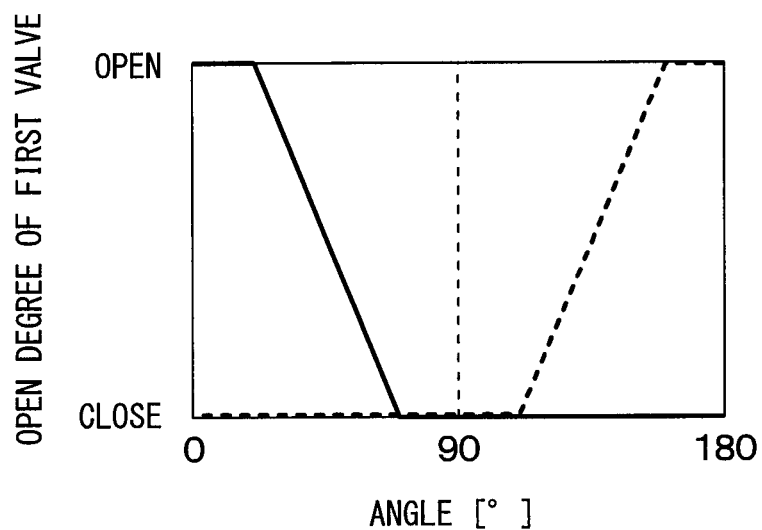
FIG. 11 is a view illustrating valve characteristics of a first valve in the switch valve of the embodiment.

First, the valve characteristic of the first valve element 3 will be described. In FIG. 11, a solid line indicates an opening degree of a passage that connects the water heater 98, the radiator 93, and the second pump 92. In FIG. 11, a broken line indicates an opening degree of a passage that connects the water cooler 97, the radiator 93, and the first pump 91.

When the first valve element 3 is located at the original position, the first distribution valve first hole 311 is located at a position that communicates with the first fluid passage hole 61, and the first fluid passage hole 61 and the first distribution valve chamber 310 communicate with each other through the first distribution valve first hole 311. On the other hand, the second fluid passage hole 62 and the first distribution valve chamber 310 are not in communication with each other.

When the first valve element 3 is located at the original position, the first collection valve first hole 321 is located at a position that communicates with the fourth fluid passage hole 64, and the fourth fluid passage hole 64 and the first collection valve chamber 320 communicate with each other through the first collection valve first hole 321. On the other hand, the fifth fluid passage hole 65 and the first collection valve chamber 320 are not in communication with each other.

Accordingly, hot water supplied from the water heater 98 flows to the radiator 93 through the first fluid passage hole 61, the first distribution valve first hole 311, the first distribution valve chamber 310, and the seventh fluid passage hole 67 in this order. Then, the hot water that has passed through the radiator 93 flows to the second pump 92 through the tenth fluid passage hole 70, the first collection valve chamber 320, the first collection valve first hole 321, and the fourth fluid passage hole 64 in this order.

That is, as illustrated in FIG. 11, when the first valve element 3 is located at the original position, the passage that connects the water heater 98, the radiator 93, and the second pump 92 is fully open, and the passage that connects the water cooler 97, the radiator 93, and the first pump 91 is fully closed.

When the first valve element 3 is rotated by 90° in the clockwise direction on the sheet of FIG. 4 from the original position, the first distribution valve first hole 311 is brought into non-communication with both the first fluid passage hole 61 and the second fluid passage hole 62. Accordingly, neither cold water supplied from the water cooler 97 nor hot water supplied from the water heater 98 flows to the radiator 93.

That is, as illustrated in FIG. 11, when the first valve element 3 is rotated by 90° in the clockwise direction on the sheet of FIG. 4 from the original position, the passage that connects the water heater 98, the radiator 93, and the second pump 92 is fully closed, and the passage that connects the water cooler 97, the radiator 93, and the first pump 91 is also fully closed.

When the first valve element 3 is rotated by 180° in the clockwise direction on the sheet of FIG. 4 from the original position, the first distribution valve first hole 311 is brought into communication with the second fluid passage hole 62, and the second fluid passage hole 62 and the first distribution valve chamber 310 communicate with each other through the first distribution valve first hole 311. On the other hand, the first fluid passage hole 61 and the first distribution valve chamber 310 are brought into non-communication with each other.

When the first valve element 3 is rotated by 180° in the clockwise direction on the sheet of FIG. 4 from the original position, the first collection valve first hole 321 is brought into communication with the fifth fluid passage hole 65, and the fifth fluid passage hole 65 and the first collection valve chamber 320 communicate with each other through the first collection valve first hole 321. On the other hand, the fourth fluid passage hole 64 and the first collection valve chamber 320 are brought into non-communication with each other.

Accordingly, cold water supplied from the water cooler 97 flows to the radiator 93 through the second fluid passage hole 62, the first distribution valve first hole 311, the first distribution valve chamber 310, and the seventh fluid passage hole 67 in this order. Then, the cold water that has passed through the radiator 93 flows to the first pump 91 through the tenth fluid passage hole 70, the first collection valve chamber 320, the first collection valve first hole 321, and the fifth fluid passage hole 65 in this order.

That is, as illustrated in FIG. 11, when the first valve element 3 is rotated by 180° in the clockwise direction on the sheet of FIG. 4 from the original position, the passage that connects the water heater 98, the radiator 93, and the second pump 92 is fully closed, and the passage that connects the water cooler 97, the radiator 93, and the first pump 91 is fully open.

In this manner, the first valve element 3 is capable of causing two kinds of fluids (that is, the hot water and the cold water) to flow into a single device (that is, the radiator 93) in a switching manner.

Figure 12:
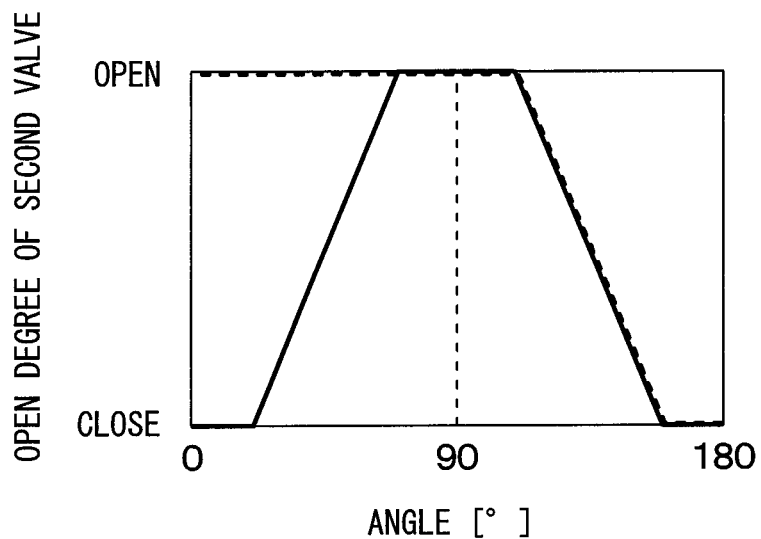
FIG. 12 is a view illustrating valve characteristics of a second valve in the switch valve of the embodiment.

Next, the valve characteristic of the second valve element 4 will be described. In FIG. 12, a solid line indicates an opening degree of a passage that connects the water heater 98, the battery temperature control heat exchanger 95, and the second pump 92. In FIG. 12, a broken line indicates an opening degree of a passage that connects the water heater 98, the heater core 94, and the second pump 92.

When the second valve element 4 is located at the original position, the second distribution valve first hole 411 is located at a position that communicates with the first fluid passage hole 61, and the first fluid passage hole 61 and the second distribution valve chamber 410 communicate with each other through the second distribution valve first hole 411. On the other hand, the third fluid passage hole 63 and the second distribution valve chamber 410 are not in communication with each other.

When the second valve element 4 is located at the original position, the second collection valve first hole 421 is located at a position that communicates with the fourth fluid passage hole 64, and the fourth fluid passage hole 64 and the second collection valve chamber 420 communicate with each other through the second collection valve first hole 421. On the other hand, the sixth fluid passage hole 66 and the second collection valve chamber 420 are not in communication with each other.

Accordingly, hot water supplied from the water heater 98 flows to the heater core 94 through the first fluid passage hole 61, the second distribution valve first hole 411, the second distribution valve chamber 410, and the eighth fluid passage hole 68 in this order. Then, the hot water that has passed through the heater core 94 flows to the second pump 92 through the eleventh fluid passage hole 71, the second collection valve chamber 420, the second collection valve first hole 421, and the fourth fluid passage hole 64 in this order.

That is, as illustrated in FIG. 12, when the second valve element 4 is located at the original position, the passage that connects the water heater 98, the heater core 94, and the second pump 92 is fully open, and the passage that connects the water heater 98, the battery temperature control heat exchanger 95, and the second pump 92 is fully closed.

When the second valve element 4 is rotated by 90° in the clockwise direction on the sheet of FIG. 4 from the original position, the second distribution valve first hole 411 is brought into communication with the third fluid passage hole 63, and the third fluid passage hole 63 and the second distribution valve chamber 410 communicate with each other through the second distribution valve first hole 411. Further, the second distribution valve second hole 412 is brought into communication with the first fluid passage hole 61, and the first fluid passage hole 61 and the second distribution valve chamber 410 communicate with each other through the second distribution valve second hole 412.

When the second valve element 4 is rotated by 90° in the clockwise direction on the sheet of FIG. 4 from the original position, the second collection valve first hole 421 is brought into communication with the sixth fluid passage hole 66, and the sixth fluid passage hole 66 and the second collection valve chamber 420 communicate with each other through the second collection valve first hole 421. Further, the second collection valve second hole 422 is brought into communication with the fourth fluid passage hole 64, and the fourth fluid passage hole 64 and the second collection valve chamber 420 communicate with each other through the second collection valve second hole 422.

Accordingly, hot water supplied from the water heater 98 flows to the heater core 94 through the first fluid passage hole 61, the second distribution valve second hole 412, the second distribution valve chamber 410, and the eighth fluid passage hole 68 in this order. Then, the hot water that has passed through the heater core 94 flows to the second pump 92 through the eleventh fluid passage hole 71, the second collection valve chamber 420, the second collection valve second hole 422, and the fourth fluid passage hole 64 in this order.

Further, hot water supplied from the water heater 98 flows to the battery temperature control heat exchanger 95 through the first fluid passage hole 61, the second distribution valve second hole 412, the second distribution valve chamber 410, the second distribution valve first hole 411, the third fluid passage hole 63, and the ninth fluid passage hole 69. Then, the hot water that has passed through the battery temperature control heat exchanger 95 flows to the second pump 92 through the twelfth fluid passage hole 72, the second collection valve first hole 421, the second collection valve chamber 420, the second collection valve second hole 422, and the fourth fluid passage hole 64 in this order.

That is, as illustrated in FIG. 12, when the second valve element 4 is rotated by 90° in the clockwise direction on the sheet of FIG. 4 from the original position, the passage that connects the water heater 98, the heater core 94, and the second pump 92 is fully open, and the passage that connects the water heater 98, the battery temperature control heat exchanger 95, and the second pump 92 is also fully open.

When the second valve element 4 is rotated by 180° in the clockwise direction on the sheet of FIG. 4 from the original position, the first fluid passage hole 61 and the second distribution valve chamber 410 are brought into non-communication with each other. Accordingly, hot water supplied from the water heater 98 flows to neither the heater core 94 nor the battery temperature control heat exchanger 95.

That is, as illustrated in FIG. 12, when the second valve element 4 is rotated by 180° in the clockwise direction on the sheet of FIG. 4 from the original position, the passage that connects the water heater 98, the heater core 94, and the second pump 92 is fully closed. Further, the passage that connects the water heater 98, the battery temperature control heat exchanger 95, and the second pump 92 is also fully closed.

In this manner, the second valve element 4 is capable of causing hot water to flow into a plurality of devices (that is, the heater core 94 and the battery temperature control heat exchanger 95) in a switching manner.

Figure 13:
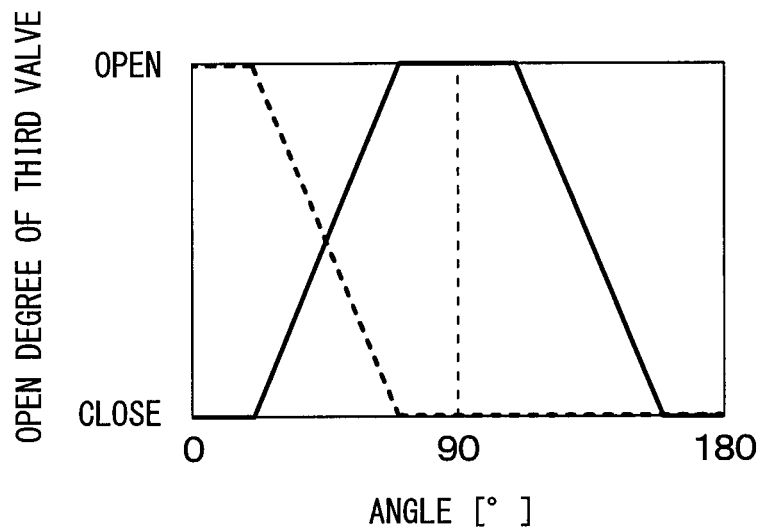
FIG. 13 is a view illustrating valve characteristics of a third valve in the switch valve of the embodiment.

Next, the valve characteristic of the third valve element 5 will be described. In FIG. 13, a solid line indicates an opening degree of a passage that connects the water cooler 97, the battery temperature control heat exchanger 95, and the first pump 91. In FIG. 13, a broken line indicates an opening degree of a passage that connects the water cooler 97, the cooler core 96, and the first pump 91.

When the third valve element 5 is located at the original position, the third distribution valve first hole 511 is located at a position that communicates with the second fluid passage hole 62, and the second fluid passage hole 62 and the third distribution valve chamber 510 communicate with each other through the third distribution valve first hole 511.

Further, the third distribution valve second hole 512 is located at a position that communicates with a part of the third fluid passage hole 63, the part connecting the second valve element housing hole 22 and the third valve element housing hole 23 to each other. Thus, the part of the third fluid passage hole 63 and the third distribution valve chamber 510 communicate with each other through the third distribution valve second hole 512. Further, the third distribution valve second hole 512 and the third distribution valve chamber 510 are not in communication with the opening side (the right side) in the third fluid passage hole 63 relative to the third valve element housing hole 23.

When the third valve element 5 is located at the original position, the third collection valve first hole 521 is located at a position that communicates with the fifth fluid passage hole 65, and the fifth fluid passage hole 65 and the third collection valve chamber 520 communicate with each other through the third collection valve first hole 521.

Further, the third collection valve second hole 522 is located at a position that communicates with a part of the sixth fluid passage hole 66, the part connecting the second valve element housing hole 22 and the third valve element housing hole 23 to each other. The part of the sixth fluid passage hole 66 and the third collection valve chamber 520 communicate with each other through the third collection valve second hole 522. Further, the third collection valve second hole 522 and the third collection valve chamber 520 are not in communication with the opening side (the right side) in the sixth fluid passage hole 66 relative to the third valve element housing hole 23.

Accordingly, cold water supplied from the water cooler 97 flows to the battery temperature control heat exchanger 95 through the second fluid passage hole 62, the third distribution valve first hole 511, the third distribution valve chamber 510, the third distribution valve second hole 512, the third fluid passage hole 63, and the ninth fluid passage hole 69 in this order. Then, the cold water that has passed through the battery temperature control heat exchanger 95 flows to the first pump 91 through the twelfth fluid passage hole 72, the sixth fluid passage hole 66, the third collection valve second hole 522, the third collection valve chamber 520, the third collection valve first hole 521, and the fifth fluid passage hole 65 in this order.

That is, as illustrated in FIG. 13, when the third valve element 5 is located at the original position, the passage that connects the water cooler 97, the battery temperature control heat exchanger 95, and the first pump 91 is fully open, and the passage that connects the water cooler 97, the cooler core 96, and the first pump 91 is fully closed.

When the third valve element 5 is rotated by 90° in the clockwise direction on the sheet of FIG. 4 from the original position, the third distribution valve first hole 511 is brought into a position that communicates with a part of the third fluid passage hole 63, the part being located at the opening side relative to the third valve element housing hole 23. Accordingly, the part of the third fluid passage hole 63 and the third distribution valve chamber 510 communicate with each other through the third distribution valve first hole 511.

The third distribution valve second hole 512 is brought into a position that communicates with the second fluid passage hole 62. Thus, the second fluid passage hole 62 and the third distribution valve chamber 510 communicate with each other through the third distribution valve second hole 512. Further, the third distribution valve second hole 512 and the third distribution valve chamber 510 are not in communication with a part of the third fluid passage hole 63, the part connecting the second valve element housing hole 22 and the third valve element housing hole 23 to each other.

When the third valve element 5 is rotated by 90° in the clockwise direction on the sheet of FIG. 4 from the original position, the third collection valve first hole 521 is brought into a position that communicates with a part of the sixth fluid passage hole 66, the part being located at the opening side relative to the third valve element housing hole 23. Accordingly, the part of the sixth fluid passage hole 66 and the third collection valve chamber 520 communicate with each other through the third collection valve first hole 521.

The third collection valve second hole 522 is brought into a position that communicates with the fifth fluid passage hole 65. Thus, the fifth fluid passage hole 65 and the third collection valve chamber 520 communicate with each other through the third collection valve second hole 522. Further, the third collection valve second hole 522 and the third collection valve chamber 520 are not in communication with a part of the sixth fluid passage hole 66, the part connecting the second valve element housing hole 22 and the third valve element housing hole 23 to each other.

Accordingly, cold water supplied from the water cooler 97 flows to the cooler core 96 through the second fluid passage hole 62, the third distribution valve second hole 512, the third distribution valve chamber 510, the third distribution valve first hole 511, and the third fluid passage hole 63 in this order. Then, the cold water that has passed through the cooler core 96 flows to the first pump 91 through the sixth fluid passage hole 66, the third collection valve first hole 521, the third collection valve chamber 520, the third collection valve second hole 522, and the fifth fluid passage hole 65 in this order.

That is, as illustrated in FIG. 13, when the third valve element 5 is rotated by 90° in the clockwise direction on the sheet of FIG. 4 from the original position, the passage that connects the water cooler 97, the battery temperature control heat exchanger 95, and the first pump 91 is fully closed, and the passage that connects the water cooler 97, the cooler core 96, and the first pump 91 is fully open.

When the third valve element 5 is rotated by 180° in the clockwise direction on the sheet of FIG. 4 from the original position, the third distribution valve first hole 511 is brought into non-communication with both the second fluid passage hole 62 and the third fluid passage hole 63. Further, the third distribution valve second hole 512 is brought into non-communication with the second fluid passage hole 62. Accordingly, cold water supplied from the water cooler 97 flows to neither the battery temperature control heat exchanger 95 nor the cooler core 96.

That is, as illustrated in FIG. 13, when third valve element 5 is rotated by 180° in the clockwise direction on the sheet of FIG. 4 from the original position, the passage that connects the water cooler 97, the battery temperature control heat exchanger 95, and the first pump 91 is fully closed, and the passage that connects the water cooler 97, the cooler core 96, and the first pump 91 is also fully closed.

In this manner, the third valve element 5 is capable of causing cold water to flow into a plurality of devices (that is, the battery temperature control heat exchanger 95 and the cooler core 96) in a switching manner.

In the present embodiment, the axes of the first to third valve element housing holes 21 to 23 are parallel to each other. Further, the first to sixth fluid passage holes 61 to 66 each having a linear shape are provided. Each of the first to sixth fluid passage holes 61 to 66 has one end connected to the peripheral wall surfaces of the first to third valve element housing holes 21 to 23 and the other end open on the outer wall surface of the housing 2. The axes of the first to sixth fluid passage holes 61 to 66 are perpendicular to the axes of the first to third valve element housing holes 21 to 23. Each of the first to sixth fluid passage holes 61 to 66 is connected to at least two of the first to third valve element housing holes 21 to 23. The perpendicular-to-axis cross section of each of the fluid passage holes partially or entirely overlaps the connected valve element housing hole in the axial direction view of each of the fluid passage holes.

With such a configuration, in the switch valve including the plurality of valve elements, the axes of the first to sixth fluid passage holes 61 to 66 connected to the peripheral wall surfaces of the first to third valve element housing holes 21 to 23 can be made parallel to each other. Thus, it is possible to downsize the housing 2 in the switch valve including the plurality of valve elements.

In the present embodiment, air flowing through the first heat insulating space 24 and the second heat insulating space 25 reduces heat transfer between fluids flowing through adjacent fluid passage holes. Accordingly, it is possible to prevent an increase in a cold water temperature caused by heat transfer and a reduction in a hot water temperature caused by heat transfer.

In the above embodiment, a plurality of fluid passage holes are connected to each of the distribution valve chambers or each of the collection valve chambers. However, a connection pattern of the fluid passage holes can be modified in various manners as modified in modifications described below.

First to fifth modifications are modifications of a three-way valve in which three fluid passage holes are connected to a valve chamber. Sixth to tenth modifications are modifications of a two-way valve in which two fluid passage holes are connected to a valve chamber. An eleventh modification is a modification of a four-way valve in which four fluid communication holes are connected to a valve chamber.

In the following description of modifications, a distribution valve chamber or a collection valve chamber is referred to as a valve chamber 11, each of first to third valve element housing holes is referred to as a valve element housing hole 12, and a fluid passage hole that is connected to an end wall surface of the valve element housing hole 12 is referred to as an axial-direction fluid passage hole 13. Further, a fluid passage hole that is connected to a peripheral wall surface of the valve element housing hole 12 and has a perpendicular-to-axis cross section partially overlapping the valve element housing hole in an axial direction view of the fluid passage hole is referred to as a tangential-direction fluid passage hole 14. That is, a fluid passage hole that is connected to the peripheral wall surface of the valve element housing hole 12 and has a perpendicular-to-axis cross section partially overlapping the valve element housing hole in the axial direction of the fluid passage hole is referred to as the tangential-direction fluid passage hole 14. The perpendicular-to-axis cross section of the fluid passage hole is a part of a plane perpendicular to the axis of the fluid passage hole, the part being included in the fluid passage hole. Further, a fluid passage hole that is connected to the peripheral wall surface of the valve element housing hole 12 and has a perpendicular-to-axis cross section entirely overlapping the valve element housing hole in an axial direction view of the fluid passage hole is referred to as a normal-direction fluid passage hole 15. That is, a fluid passage hole that is connected to the peripheral wall surface of the valve element housing hole 12 and has a perpendicular-to-axis cross section entirely overlapping the valve element housing hole in the axial direction of the fluid passage hole is referred to as the normal-direction fluid passage hole 15.

Figure 14:
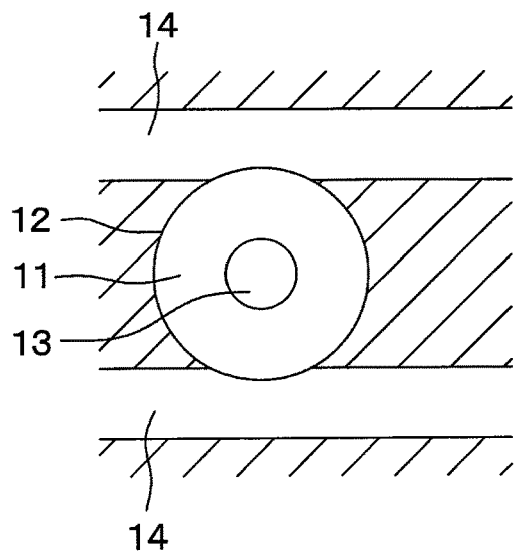
FIG. 14 is a sectional view illustrating a first modification of the switch valve of the embodiment.

In the first modification illustrated in FIG. 14, one axial-direction fluid passage hole 13 and two tangential-direction fluid passage holes 14 are connected to a valve chamber 11.

Figure 15:
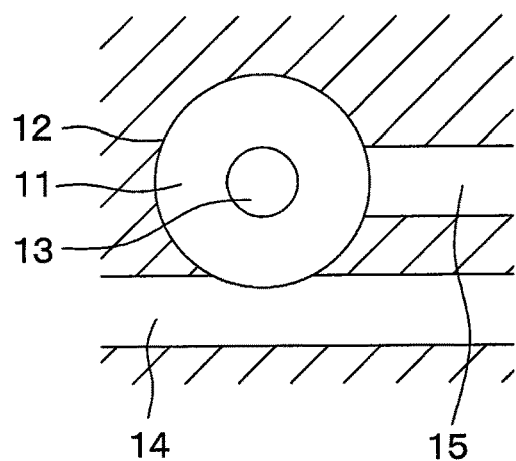
FIG. 15 is a sectional view illustrating a second modification of the switch valve of the embodiment.

In the second modification illustrated in FIG. 15, one axial-direction fluid passage hole 13, one tangential-direction fluid passage hole 14, and one normal-direction fluid passage hole 15 are connected to a valve chamber 11.

Figure 16:
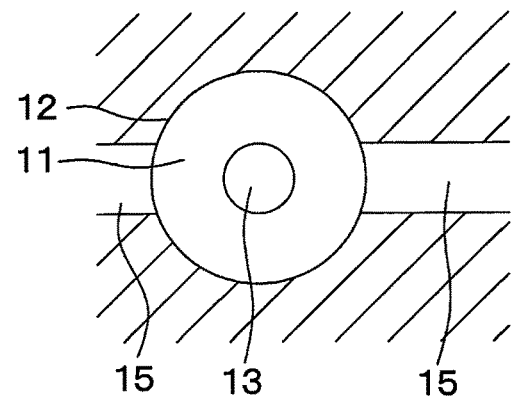
FIG. 16 is a sectional view illustrating a third modification of the switch valve of the embodiment.

In the third modification illustrated in FIG. 16, one axial-direction fluid passage hole 13 and two normal-direction fluid passage holes 15 are connected to a valve chamber 11.

Figure 17:
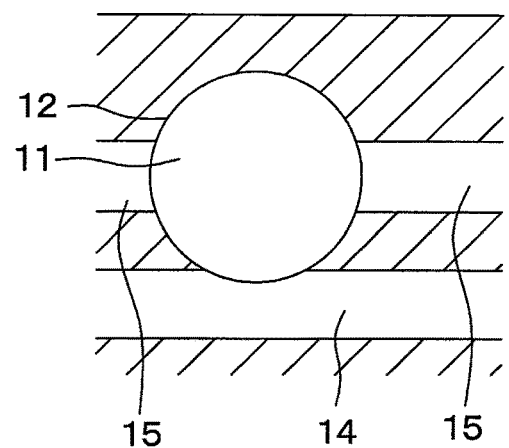
FIG. 17 is a sectional view illustrating a fourth modification of the switch valve of the embodiment.

In the fourth modification illustrated in FIG. 17, one tangential-direction fluid passage hole 14 and two normal-direction fluid passage holes 15 are connected to a valve chamber 11.

Figure 18:
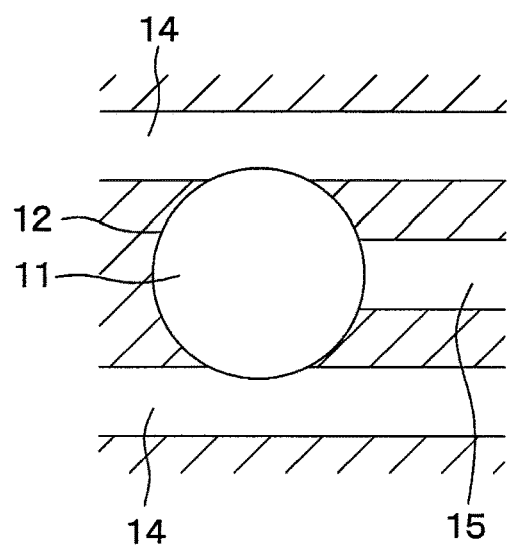
FIG. 18 is a sectional view illustrating a fifth modification of the switch valve of the embodiment.

In the fifth modification illustrated in FIG. 18, two tangential-direction fluid passage holes 14 and one normal-direction fluid passage hole 15 are connected to a valve chamber 11.

Figure 19:
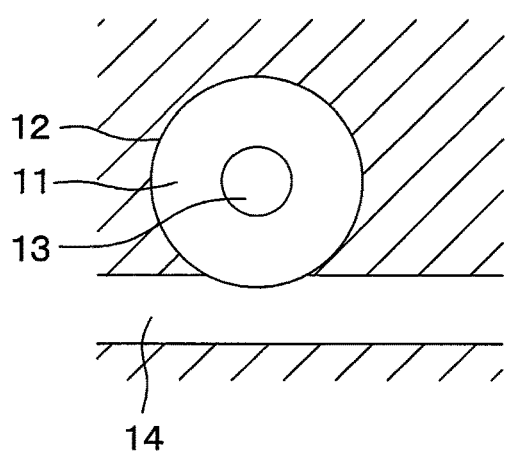
FIG. 19 is a sectional view illustrating a sixth modification of the switch valve of the embodiment.

In the sixth modification illustrated in FIG. 19, one axial-direction fluid passage hole 13 and one tangential-direction fluid passage hole 14 are connected to a valve chamber 11.

Figure 20:
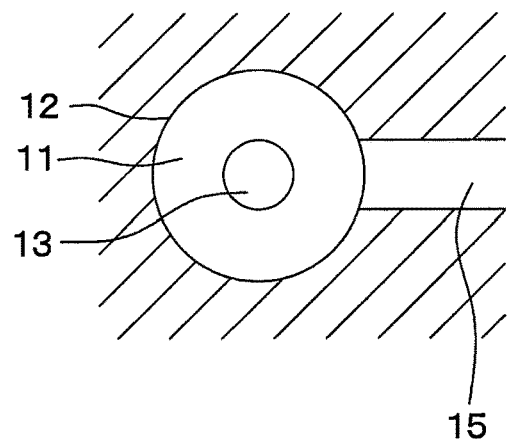
FIG. 20 is a sectional view illustrating a seventh modification of the switch valve of the embodiment.

In the seventh modification illustrated in FIG. 20, one axial-direction fluid passage hole 13 and one normal-direction fluid passage hole 15 are connected to a valve chamber 11.

Figure 21:
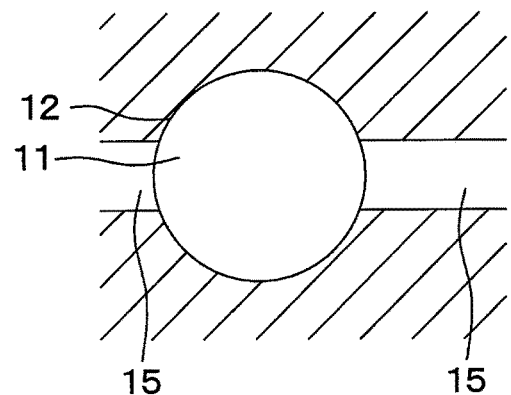
FIG. 21 is a sectional view illustrating an eighth modification of the switch valve of the embodiment.

In the eighth modification illustrated in FIG. 21, two normal-direction fluid passage holes 15 are connected to a valve chamber 11.

Figure 22:
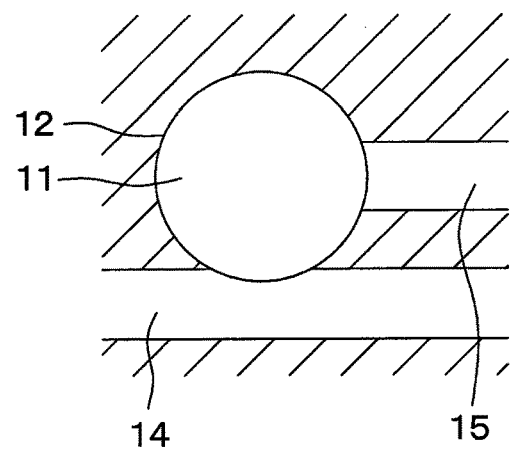
FIG. 22 is a sectional view illustrating an ninth modification of the switch valve of the embodiment.

In the ninth modification illustrated in FIG. 22, one tangential-direction fluid passage hole 14 and one normal-direction fluid passage hole 15 are connected to a valve chamber 11.

Figure 23:
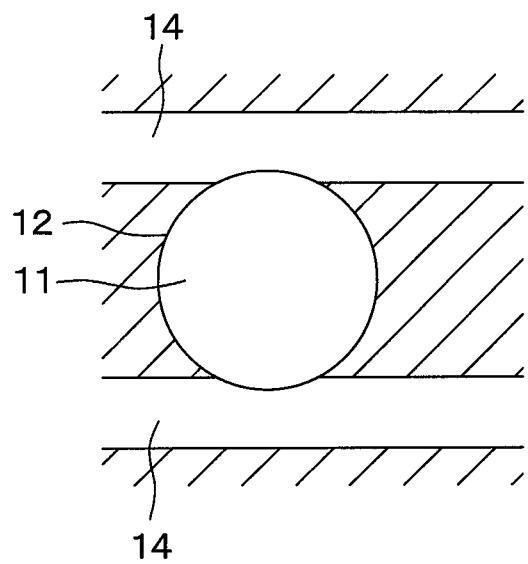
FIG. 23 is a sectional view illustrating a tenth modification of the switch valve of the embodiment.

In the tenth modification illustrated in FIG. 23, two tangential-direction fluid passage holes 14 are connected to a valve chamber 11.

Figure 24:
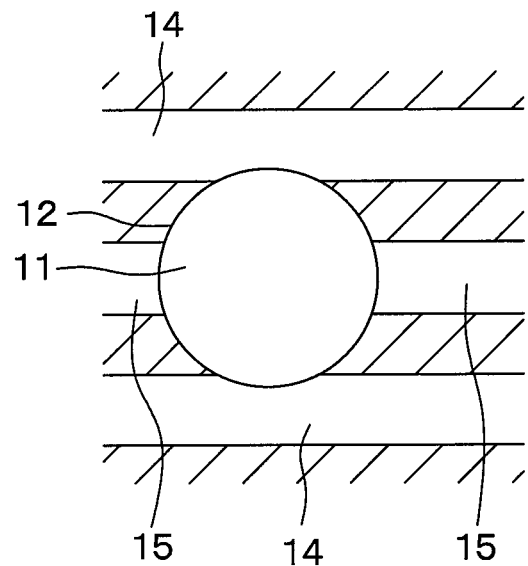
FIG. 24 is a sectional view illustrating an eleventh modification of the switch valve of the embodiment.

In the eleventh modification illustrated in FIG. 24, two tangential-direction fluid passage holes 14 and two normal-direction fluid passage holes 15 are connected to a valve chamber 11.

Other Embodiments

In the above embodiment, each of the axes of the first to third valve element housing holes 21 to 23 is aligned with the top-bottom direction when the switch valve 1 is mounted on the vehicle. However, each of the axes of the first to third valve element housing holes 21 to 23 may be aligned with the horizontal direction when the valve 1 is mounted on the vehicle.

In the above embodiment, the passages through which a fluid flows are opened and closed by rotating each of the first to third valve elements 3 to 5 around the axis thereof. However, the amount of a fluid flowing through the passages may be continuously changed with the rotation of each of the first to third valve elements 3 to 5.

The present disclosure is not restricted to the embodiment mentioned, and can be implemented with various modification.

In the respective embodiments above, it goes without saying that elements forming the embodiments are not necessarily essential unless specified as being essential or deemed as being apparently essential in principle.

In a case where a reference is made to the components of the respective embodiments as to numerical values, such as the number, values, amounts, and ranges, the components are not limited to the numerical values unless specified as being essential or deemed as being apparently essential in principle.

Also, in a case where a reference is made to the components of the respective embodiments above as to shapes and positional relations, the components are not limited to the shapes and the positional relations unless explicitly specified or limited to particular shapes and positional relations in principle.

CONCLUSION

According to a first aspect described in part or the whole of the above embodiment, the axes of the plurality of valve element housing holes are parallel to each other. The axes of the plurality of fluid passage holes are parallel to each other and perpendicular to the axes of the valve element housing holes. Each of the fluid passage holes is connected to at least two of the valve element housing holes, and has a perpendicular-to-axis cross section partially or entirely overlapping the at least two valve element housing holes in the axial direction of the fluid passage hole.

According to a second aspect, at least one of the valve elements causes two kinds of fluids to flow into one of the plurality of external devices in a switching manner.

According to a third aspect, at least one of the vale elements causes cold water and hot water to flow to one device in a switching manner, and at least one of the valve elements causes only either the cold water or the hot water to flow into a plurality of external devices.

According to the fourth aspect, the two kinds of fluids flowing through the fluid passage holes are cold water and hot water. The housing includes a heat insulating space between adjacent two of the fluid passage holes. The heat insulating space reduces heat transfer between a fluid flowing through one of the two fluid passage holes and a fluid flowing through the other fluid passage hole.

Accordingly, it is possible to prevent an increase in a cold water temperature caused by heat transfer and a reduction in a hot water temperature caused by heat transfer.

What is claimed is:

1. A switch valve that controls flows of two kinds of fluids to a plurality of external devices, the switch valve comprising:
   a housing; and
   a plurality of valve elements that are housed in the housing and switch the flows of the two kinds of fluid by rotation around respective axes, wherein:
   the housing includes a plurality of valve element housing holes that have a cylindrical shape and rotatably house the valve elements therein, and a plurality of fluid passage holes each having a linear shape, each of the fluid passage holes having one end connected to a peripheral wall surface of one of the valve element housing holes and the other end open on an outer wall surface of the housing to circulate the fluids;

axes of the valve element housing holes are parallel to each other;

axes of the fluid passage holes are parallel to each other and perpendicular to the axes of the valve element housing holes;

each of the fluid passage holes is connected to at least two of the valve element housing holes, and has a perpendicular-to-axis cross section partially or entirely overlapping the at least two valve element housing holes in an axial direction of the fluid passage hole, and two fluid passage holes are directly connected to the peripheral wall surface of one valve element housing hole respectively at a front side and a back side in a depth direction of the housing perpendicular to the axes of the fluid passage holes and perpendicular to the axes of the valve element housing hole.

2. The switch valve according to claim 1, wherein at least one of the valve elements causes the two kinds of fluids to flow into one of the external devices in a switching manner.

3. The switch valve according to claim 1, wherein:

the two kinds of fluids are cold water and hot water;

at least one of the plurality of valve elements causes the cold water and the hot water to flow into one of the external devices in a switching manner; and at least one of the plurality of valve elements causes only either the cold water or the hot water to flow into two or more of the external devices.

4. The switch valve according to claim 1, wherein:

the two kinds of fluids are cold water and hot water; and the housing includes a heat insulating space that is formed between adjacent two of the fluid passage holes and reduces heat transfer between a fluid flowing through one of the two fluid passage holes and a fluid flowing through the other fluid passage hole.

5. The switch valve according to claim 1, wherein:

the fluid passage holes extend tangentially with respect to the valve elements and are located opposite to each other through the valve elements in the depth direction of the housing perpendicular to the fluid passage holes and axes of the valve elements.

6. A switch valve that controls flows of two kinds of fluids to a plurality of external devices, the switch valve comprising:

a housing; and a plurality of valve elements that are housed in the housing and switch the flows of the two kinds of fluid by rotation around respective axes, wherein:

the housing includes a plurality of valve element housing holes that have a cylindrical shape and rotatably house the valve elements therein, and a plurality of fluid passage holes each having a linear shape, each of the fluid passage holes having one end connected to a peripheral wall surface of one of the valve element housing holes and the other end open on an outer wall surface of the housing to circulate the fluids;

axes of the valve element housing holes are parallel to each other;

axes of the fluid passage holes are parallel to each other and perpendicular to the axes of the valve element housing holes;

each of the fluid passage holes is connected to at least two of the valve element housing holes;

each of the fluid passage holes has a perpendicular-to-axis cross section partially or entirely overlapping the at least two valve element housing holes in an axial direction of the fluid passage hole;

the two kinds of fluids are cold water and hot water; and the housing includes a heat insulating space that is formed between adjacent two of the fluid passage holes and reduces heat transfer between a fluid flowing through one of the two fluid passage holes and a fluid flowing through the other fluid passage hole.

7. The switch valve according to claim 6, wherein at least one of the valve elements causes the two kinds of fluids to flow into one of the external devices in a switching manner.

8. The switch valve according to claim 6, wherein:

at least one of the valve elements causes the cold water and the hot water to flow into one of the external devices in a switching manner; and at least one of the valve elements causes only either the cold water or the hot water to flow into two or more of the external devices.

9. The switch valve according to claim 6, wherein:

two fluid passage holes are directly connected to the peripheral wall surface of one valve element housing hole.

10. The switch valve according to claim 6, wherein:

the fluid passage holes extend tangentially with respect to the valve elements and are located opposite to each other through the valve elements in a depth direction of the housing perpendicular to the fluid passage holes and axes of the valve elements.

* * * * *